United States Patent [19]

Takeuchi et al.

[11] Patent Number: 4,461,883

[45] Date of Patent: Jul. 24, 1984

[54] PROCESS FOR PRODUCING CONJUGATED DIENE POLYMER USING A SOLUBILIZED LANTHANUM CARBOXYLATE CATALYST

[75] Inventors: Yasumasa Takeuchi, Yokohama; Mitsuhiko Sakakibara; Tooru Shibata, both of Yokkaichi, all of Japan

[73] Assignee: Japan Synthetic Rubber Co., Ltd., Tokyo, Japan

[21] Appl. No.: 387,780

[22] Filed: Jun. 14, 1982

[30] Foreign Application Priority Data

Jun. 29, 1981 [JP] Japan .................................. 56-99684
Sep. 28, 1981 [JP] Japan ................................ 56-152219
Oct. 2, 1981 [JP] Japan ................................ 56-156214

[51] Int. Cl.$^3$ ........................... C08F 4/14; C08F 4/52; C08F 2/06
[52] U.S. Cl. ..................... 526/139; 502/102; 526/140; 526/141; 526/142; 526/340.2; 526/340.4
[58] Field of Search ............... 526/139, 140, 141, 142, 526/161, 163, 164

[56] References Cited

U.S. PATENT DOCUMENTS

| | | | |
|---|---|---|---|
| 4,145,497 | 3/1979 | Sylvester | 526/164 |
| 4,166,167 | 8/1979 | Bye | 526/164 |
| 4,242,232 | 12/1980 | Sylvester | 526/151 |

FOREIGN PATENT DOCUMENTS

| | | | |
|---|---|---|---|
| 54-40890 | 3/1979 | Japan . | |
| 55-12189 | 1/1980 | Japan . | |
| 55-66903 | 5/1980 | Japan . | |
| 673037 | 10/1963 | United Kingdom | 526/164 |
| 2002003 | 2/1979 | United Kingdom . | |

Primary Examiner—C. A. Henderson
Attorney, Agent, or Firm—Oblon, Fisher, Spivak, McClelland & Maier

[57] ABSTRACT

A process for producing a conjugated diene polymer, characterized by polymerizing at least one conjugated diene with a catalyst consisting of (A) a reaction product of a Lewis base and a carboxylate of a rare earth element of the lanthanum series represented by $Ln(R^1CO_2)_3$ wherein Ln is a rare earth element of the lanthanum series having an atomic number of 57 to 71 and $R^1$ is a hydrocarbon substituent having 1 to 20 carbon atoms, (B) an organic aluminum compound represented by $AlR^2R^3R^4$ wherein $R^2$, $R^3$ and $R^4$, which may be identical or different, represent hydrogen atoms or hydrocarbon substituents having 1 to 8 carbon atoms, excluding the case where all of $R^2$, $R^3$ and $R^4$ are hydrogen atoms at the same time, and (C) an (alkyl)aluminum halide represented by $AlX_nR^5{}_{3-n}$ wherein X is Cl, Br, F or I; $R^5$ is a hydrocarbon substituent having 1 to 8 carbon atoms; and n has a value of 1, 1.5, 2 or 3, or consisting of these (A), (B) and (C) components and (D) a conjugated diene. A polymer obtained by said process has a high cis-1,4-configuration content and is excellent in physical properties of vulcanizate.

27 Claims, No Drawings

PROCESS FOR PRODUCING CONJUGATED DIENE POLYMER USING A SOLUBILIZED LANTHANUM CARBOXYLATE CATALYST

This invention relates to a process for producing a conjugated diene polymer by polymerizing at least one conjugated diene with a novel catalyst. More particularly, it relates to a process for producing a conjugated diene polymer having a high 1,4-configuration content, excellent physical properties of vulcanizate, and, optionally, a regulated molecular weight, by polymerizing a conjugated diene with a catalyst comprising a reaction product of a Lewis base and a carboxylate of a rare earth element of the lanthanum series, an organic aluminum compound, and an (alkyl)aluminum halide.

Cis-1,4-polyisoprene and cis-1,4-polybutadiene are produced as general purpose synthetic rubber and widely used particularly as materials for tyres. However, these conjugated diene polymers leave room for improvement, for example, cis-1,4-polyisoprene is inferior to natural rubber in physical properties, and investigations are being continued. This invention provides one result of the investigations.

As to a catalyst containing a rare earth element for polymerization of a conjugated diene, polymerization of butadiene by use of neodymium naphthenate, (i-$C_4H_9)_3$Al and $Al_2(C_2H_5)_3Cl_3$ has been reported in the "Journal Polymer Science", Vol. 18, 3345 (1980). However, according to this method, neodymium naphthenate is very difficult to dissolve in a hydrocarbon solvent. Moreover, the catalyst consisting of the combination described above is low in polymerization activity, and hence, disadvantageous for industrial use.

In said literature reference, there has been reported polymerization of butadiene with a ternary catalyst consisting of $NdCl_3$, an alcohol and $Al(C_2H_5)_3$. However, there are many problems when a catalyst system consisting of this combination is used for polymerization. That is to say, $NdCl_3$ is solid and insoluble in a hydrocarbon solvent. The reaction product of $NdCl_3$ and an alcohol gives a precipitate insoluble in a hydrocarbon solvent depending upon the quantity of the water of crystallization of $NdCl_3$. Therefore, the resulting catalyst component is heterogeneous. This is very disadvantageous for using it for industrial purposes. Furthermore, catalyst systems consisting of the combination described above have defects, for example, low polymerization activity.

In Japanese Patent Application Kokai (Laid-Open) No. 12,189/80, there has been reported polymerization of a conjugated diene with $AlR_3$ and a Lewis acid which uses a reaction product of neodymium with $AlR_3$. However, the reaction product of neodymium carboxylate with $AlR_3$ reacts readily with slight amounts of moisture and oxygen to lower the polymerization activity greatly. Accordingly, a special technique is required for handling the reaction product of neodymium carboxylate with $AlR_3$, so that the polymerization described above has disadvantages that many restrictions are required in its industrial use.

The object of this invention is to overcome these disadvantages and provide a polymerization catalyst which is not so restricted technically in the industrialization and which has a high activity.

According to this invention, there is provided a process for producing a conjugated diene polymer, characterized by polymerizing at least one conjugated diene with a catalyst comprising (A) a reaction product of a Lewis base and a carboxylate of a rare earth element in the lanthanum series represented by $Ln(R^1CO_2)_3$ wherein Ln is a rare earth element in the lanthanum series having an atomic number of 57 to 71 and $R^1$ is a hydrocarbon substituent having 1 to 20 carbon atoms, (B) an organic aluminum compound represented by $AlR^2R^3R^4$ wherein $R^2$, $R^3$ and $R^4$, which may be identical or different, represent hydrogen atoms or hydrocarbon substituents having 1 to 8 carbon atoms, excluding the case where $R^2$, $R^3$ and $R^4$ are hydrogen atoms at the same time, and (C) and (alkyl)aluminum halide represented by $AlX_nR^5{}_{3-n}$ wherein X is Cl, Br, F or I; $R^5$ is an alkyl group having 1 to 8 carbon atoms, which may be a straight chain, branched chain or cyclic alkyl; n is a value of 1, 1.5, 2 or 3, or comprising the (A), (B) and (C) components and (D) a conjugated diene.

In this invention, Ln is a rare earth element in the lanthanum series having an atomic number of 57 to 71, and cerium, praseodymium, neodymium and gadolinium are preferred, and particularly neodymium is preferably used because they are easily available in industry. The Ln may be a mixture of two or more rare earth elements.

The carboxylic acid linked to the rare earth element is represented by $R^1CO_2H$ where $R^1$ is a hydrocarbon substituent having 1 to 20 carbon atoms, which is usually a saturated or unsaturated alkyl group which may be straight, branched or cyclic, and the carboxyl group is linked to the primary, secondary or tertiary carbon atom. Examples of the carboxylic acid are acetic acid, propionic acid, isobutyric acid, n-valeric acid, isovaleric acid, pivalic acid, n-hexanoic acid, 3,3-dimethylbutyric acid, n-heptanoic acid, n-octanoic acid, 2-ethylhexanoic acid, cyclohexanoic acid, benzoic acid, naphthenic acid, stearic acid, lauric acid, palmitic acid, oleic acid, and the like. Among them, carboxylic acids having 5 or more carbon atoms, particularly octanoic acid, 2-ethylhexanoic acid, benzoic acid, naphthenic acid, oleic acid and stearic acid, are preferred.

The Lewis base used in this invention includes, for example, acetylacetone, tetrahydrofuran, pyridine, N,N'-dimethylformamide, thiophene, diphenyl ether, triethylamine, organic phosphorus compounds, monohydric and dihydric alcohols having 1 to 10 carbon atoms such as methyl alcohol, ethyl alcohol, n-propyl alcohol, isopropyl alcohol, n-butyl alcohol, isobutyl alcohol, tert-butyl alcohol, n-pentyl alcohol, isopentyl alcohol, 2-methyl-1-butyl alcohol, 2-methyl-2-butyl alcohol, n-hexyl alcohol, n-heptyl alcohol, n-octyl alcohol, isooctyl alcohol, 2-ethylhexyl alcohol, n-nonyl alcohol, n-decyl alcohol, 1,5-pentanediol, 1,6-hexanediol, allyl alcohol, crotyl alcohol, 3-hexen-1-ol, citronellol, cyclopentanol, cyclohexanol, salicyl alcohol, benzyl alcohol, phenethyl alcohol, cinnamyl alcohol, and the like. Among them, acetylacetone, methyl alcohol, ethyl alcohol and pyridine are preferred.

Examples of the organic aluminum compound (B) of $AlR^2R^3R^4$ used in this invention include trimethylaluminum, triethylaluminum, tri-n-propylaluminum, triisopropylaluminum, tri-n-butylaluminum, triisobutylaluminum, trihexylaluminum, tricyclohexylaluminum, trioctylaluminum, diethylaluminum hydride, diisobutylaluminum hydride, and the like, and they may be used alone or in admixture of two or more. Among them, triethylaluminum, triisobutylaluminum, diisobutylaluminum hydride are preferred.

The organic aluminum compound (B) is used in an amount of at least about two moles per mole of the carboxylate of a rare earth element. Even when the constituent (B) is used alone, it is possible to regulate the molecular weight of polymer. However, the use of a mixture of (B') AlR$^{2'}_3$ wherein R$^{2'}$ is a hydrocarbon having 1 to 8 carbon atoms and (B'') AlH$_m$R$^{2'}_{3-m}$ wherein R$^{2'}$ is the same as defined above and m is a value of 1 or 2 is preferred because even when the monomer/Ln ratio is larger and the aluminum content in the polymerization system is lower the molecular weight can satisfactorily be regulated. When as the constituent (B), the mixture of (B') and (B'') is used in a molar ratio (B')/(B'') of 95/5 to 25/75, preferably 90/10 to 50/50 and the molar ratio (C)/(A) is 0.1/1 to 10/1 while the molar ratio ((B')+(B''))/(A) is at least 10/1, the molecular weight of the polymer to be produced can be particularly preferably regulated and the resulting catalyst can have an enhanced polymerization activity. That is to say, even if the amount of the catalyst used is small, a butadiene polymer having a commercially useful molecular weight can be obtained in a high yield.

Examples of the (alkyl)aluminum halide (C) represented by AlX$_n$R$^5_{3-n}$ used in this invention include dimethylaluminum chloride, diethylaluminum chloride, diethylaluminum bromide, diethylaluminum iodide, diethylaluminum fluoride, di-n-propylaluminum chloride, di-n-butylaluminum chloride, diisobutylaluminum chloride, methylaluminum dichloride, ethylaluminum dichloride, isobutylaluminum dichloride, sesquimethylaluminum chloride, sesquiethylaluminum chloride, sesquiisobutylaluminum chloride, aluminum trichloride, aluminum tribromide, aluminum triiodide, aluminum trifluoride, and the like, and they may be used alone or in admixture of two or more. Said (alkyl)aluminum halide may be replaced by a reaction product of the aforesaid organic aluminum compound (B) with the (alkyl)aluminum halide (C).

The molar ratio of the carboxylate of a rare earth element to the Lewis base is preferably 1:0.01 to 1:100, more preferably 1:0.05 to 1:50, and most preferably 1:0.1 to 1:30.

The molar ratio of the carboxylate of a rare earth element to the organic aluminum compound (B) is preferably 1:2 to 1:300, more preferably 1:20 to 1:150.

The molar ratio of the carboxylate of a rare earth element to the (alkyl)aluminum halide (C) is preferably 1:0.5 to 1:10, more preferably 1:1 to 1:5.

The molar ratio of the carboxylate of a rare earth element to the conjugated diene (D) is preferably 1:0 to 1:1000, more preferably 1:0.5 to 1:500, and most preferably 1:2 to 1:100. As the conjugated diene for producing a catalyst, there may be used isoprene, butadiene, 1,3-pentadiene and the like similarly to the case of the conjugated diene monomer to be polymerized. Although the conjugated diene as a constituent of the catalyst is not indispensable, its employment is advantageous in that the resulting catalyst have a further improved polymerization activity of the catalyst.

In the process for preparing a catalyst, the constituent (A) of the catalyst is first prepared by reacting Ln(R$^1$CO$_2$)$_3$ with a Lewis base. In this case, Ln(R$^1$CO$_2$)$_3$ is directly mixed and reacted with the Lewis base, or reacted with the Lewis base in the presence of a suitable solvent, for example, n-hexane, cyclohexane, benzene, toluene or the like. In usual, Ln(R$^1$CO$_2$)$_3$ is added to a solution of the Lewis base in a solvent, and then the two are reacted in the solvent. The reaction temperature ranges from −50° C. to 150° C., preferably from 0° C. to 50° C.

Subsequently, the constituent (A) is reacted with the constituents (B) and (C) of the catalyst. In this case, the order of additions to a vessel is not critical, and there may be used any of the orders (A)→(B)→(C), (A)→(C)→(B), (B)→(A)→(C), (B)→(C)→(A), (C)→(A)→(B) and (C)→(B)→(A). The reaction temperature ranges from −30° C. to +100° C., preferably from 0° C. to +80° C.

The conjugated diene (D) may be added at any time in each of the above-mentioned order of additions, and it is preferable for improving the polymerization activity of the catalyst and for shortening the induction time for the initiation of polymerization that the above-mentioned constituents of the catalyst are previously mixed, reacted and then aged. However, the catalyst constituents may be succeedingly added to the solvent and the monomer.

The thus obtained catalyst is used for polymerizing a conjugate diene.

Conjugated dienes to be polymerized with the catalyst of this invention include isoprene, 1,3-butadiene, 1,3-pentadiene and the like. They may be used alone or in admixture of two or more, and isoprene is particularly preferred.

The amount of the catalyst used may be varied depending upon the molecular weight of the desired polymer. In usual, at least one conjugated diene is charged into a reactor in an amount of 1,000 to 500,000 moles, preferably 5,000 to 100,000 moles, per mole of the carboxylate of the rare earth element in the catalyst, and then polymerized. The polymerization conditions are the same as for the polymerization of a conjugated diene by use of a nickel, cobalt or titanium catalyst containing an organic aluminum as one constituent. The polymerization is usually effected in a hydrocarbon solvent, for example, butane, n-pentane, isopentane, n-hexane, n-heptane, cyclohexane, cycloheptane, benzene, toluene or a mixture of two or more of them. The polymerization may be effected in the absence of any solvent by adding the catalyst to a monomer. When the hydrocarbon solvent contains a substituted aromtic hydrocarbon having active hydrogen, in a proportion of 80% by weight or less, preferably 0.3 to 80% by weight, more preferably 1 to 50% by weight, the molecular weight of the polymer to be produced can be regulated to any desired value. When the proportion of said aromatic hydrocarbon exceeds 80%, the polymerization activity is greatly lowered. When it is less than 0.3% by weight, the molecular weight cannot sufficiently be regulated. As said aromatic hydrocarbons, those having active hydrogen at the benzyl position are preferred. As the said aromatic hydrocarbons, there may be used, for example, toluene, ethylbenzene, xylene, propylbenzene, isopropylbenzene, mesitylene, 2,4-dihydronaphthalene, and the like. The polymerization temperature ranges, in usual, from −30° C. to 120° C., preferably from 10° C. to 80° C. The polymerization may be conducted either batchwise or continuously.

The polymerization is terminated by adding a polymerization-terminator to the reaction system after the predetermined conversion is reached, and the removal of the solvent and drying are carried out by a usual method, whereby a conjugated diene polymer is produced.

The thus produced diene polymer is used as the so-called "synthetic rubber for general use" in tyres, belts, sheets, rubber materials for industrial use, and the like.

The characteristics of this invention are summarized as follows:

(a) The reaction product of the Lewis base and the carboxylate of a rare earth element in the lanthanum series used in this invention is soluble in a hydrocarbon solvent and inert to moisture and oxygen, and therefore, its handling is easy and requires no special technique.

(b) The catalyst used in this invention has a high polymerization activity to a conjugated diene.

(c) The conjugated diene polymer obtained according to this invention has a high cis-1,4-configuration content and shows a broad molecular weight distribution. It is excellent in processability as raw rubber, and its valcanizate is excellent in mechanical characteristics.

This invention is further explained below in more detail referring to Examples, which are not by way of limitation but by way of illustration.

In the Examples, microstructure was determined by a nuclear magnetic resonance analysis, but that of polybutadiene was determined by infrared spectral analysis according to the Morero method.

EXAMPLE 1

In a dried, 200-ml, three-necked flask was placed 1.2 millimoles of neodymium tri-2-ethylhexanate in a nitrogen atmosphere, and 2.4 millimoles of acetylacetone was added thereto. To the resulting mixture was added 50 ml of cyclohexane while stirring the mixture by means of a magnetic stirrer. The stirring was continued at room temperature for 30 minutes. The reaction mixture thus obtained was a purple liquid and had substantially the same viscosity as that of cyclohexane alone. The solution could freely be diluted with cyclohexane, and such a change as discoloration or the like is not caused even when air was blown thereinto.

Subsequently, 12 millimoles of isoprene was added to the solution, followed by adding thereto a 2 moles/liter cyclohexane solution of 60 millimoles of triethylaluminum, and a 1 mole/liter cyclohexane solution of 3 millimoles of diethylaluminum chloride. The resulting mixture was diluted with cyclohexane so that the total volume became 120 ml, and then subjected to reaction at 50° C. for 30 minutes. The molar ratios of the constituents of the catalyst thus obtained were as follows: The amounts of acetylacetone, isoprene, triethylaluminum and diethylaluminum chloride per mole of the neodymium compound were 2, 10, 50 and 2.5 moles, respectively. On the other hand, 5 kg of cyclohexane and 1 kg of isoprene were placed in a dried nitrogen atmosphere in a 10-liter stainless steel reactor equipped with a stirrer and a thermoregulator, and the temperature of the mixture thus obtained was adjusted to 60° C. To the mixture was added 100 ml of the above-mentioned catalyst solution, and the resulting mixture was subjected to polymerization at 60° C. for 3 hours. The polymerization conversion was 99%. After completion of the reaction, the reaction solution was poured into a large amount of methanol containing a small amount of 2,6-di-tertbutylcresol to terminate the reaction and coagulate the polymer. The polymer was dried overnight in vacuo at 50° C. The microstructure of polyisoprene was cis-1,4=97.8% and 3,4=2.2%. Its glass transition temperature (Tg) was −75° C. as measured by DSC thermal analysis, and its Mooney viscosity ($ML_{1+4}100°$ C.) was 65.0.

For comparison of the polyisoprene thus obtained with commercially available polyisoprene (IR2200 manufactured by Japan Synthetic Rubber Co., Ltd.), compounds were prepared according to the ASTM D3403 recipe shown in Table 1 and subjected to press vulcanization at 135° C. for 40 minutes.

TABLE 1

| Compounding recipe | | |
|---|---|---|
| Polymer | 100 | parts by weight |
| Zinc oxide | 5 | " |
| Sulfur | 2.25 | " |
| Stearic acid | 2 | " |
| Carbon black (HAF) | 35 | " |
| Vulcanization accelerator TBDS*1 | 0.7 | " |

*[1]N—tetrabutyl-2-benzothiazolesulfenamide

In the above compounding, the compound comprising the polymer obtained according to this invention was superior to that comprising the commercially available polymer in knitting performance and gloss of the compound on roll.

The results of the measurement of mechanical properties of the vulcanization products are shown in Table 2. It was found from the results that the polymer obtained by the process of this invention was superior in all aspects, and particularly superior in cut growth, to the commercially available polymer.

TABLE 2

| | Example 1 | Commercial polymer |
|---|---|---|
| Modulus (100%)(kg/cm$^2$) | 32 | 29 |
| Modulus (300%)(kg/cm$^2$) | 132 | 130 |
| Tensile strength (kg/cm$^2$) | 300 | 290 |
| Elongation (%) | 600 | 580 |
| de Mattia cut growth (the number of times until completely torn) | 180,000 to 200,000 times | 90,000 to 100,000 times |

COMPARATIVE EXAMPLE 1

Polymerization was effected in the same manner as in Example 1, except that a catalyst was prepared in the following manner:

Preparation of catalyst:

In a dried, 200-ml, three-necked flask was placed 1.2 millimoles of neodymium tri-2-ethylhexanate in a nitrogen atmosphere and 50 ml of cyclohexane was added thereto. The neodymium tri-2-ethylhexanate was insoluble in the cyclohexane. The former was insoluble in the latter even when the resulting mixture was further heated, and the mixture was in the heterogeneous, highly viscous gel state.

Subsequently, to the mixture were added 12 millimoles of isoprene, a 2 moles/liter cyclohexane solution of 60 millimoles of triethylaluminum and a 1 mole/liter cyclohexane solution of 3 millimoles of diethylaluminum chloride. The resulting mixture was subjected to reaction at 50° C. for 30 minutes.

Using the catalyst thus obtained, isoprene was polymerized at 60° C. for 3 hours in the same manner as in Example 1. The polymerization conversion was 64%. The microstructure of the resulting polymer was cis-1,4=94.1% and 3,4=5.9%. Its Mooney viscosity ($ML_{1+4}100°$ C.) was 51.5.

EXAMPLES 2 TO 16

In a dried, 100-ml, three-necked flask was placed 1.0 millimole of neodymium tri-2-ethylhexanate, and 10 ml of cyclohexane was added thereto. Subsequently, the predetermined amount of each of the various Lewis bases shown in Table 3 was added thereto, after which the resulting mixture was subjected to reaction with stirring at room temperature for 30 minutes. In the case of all the combinations, the reaction product was soluble in cyclohexane. After completion of the reaction, 10 millimoles of isoprene was added to the reaction solution, followed by adding thereto 10 millimoles of triethylaluminum diluted with cyclohexane in a proportion of 1.0 mole per liter, and 2.5 millimoles of diethylaluminum chloride. The resulting mixture was subjected to reaction at 30° C. for 30 minutes. The series of operations were carried out in a nitrogen atmosphere.

Separately, 200 ml of cyclohexane and 40 ml of isoprene were hermetically sealed into a dried 300-ml pressure bottle in a nitrogen atmosphere. The catalyst reaction mixture was taken in such an amount that the number of moles of neodymium metal became 0.04 millimoles, and poured into the 300-ml pressure bottle. The contents of the presure bottle were subjected to polymerization for 2 hours while the pressure bottle was rotated in a water tank at 60° C. After the polymerization, the same procedure as described in Example 1 was carried out. The results are summarized in Table 3.

COMPARATIVE EXAMPLE 2

The same procedure as in Example 2 was repeated, except that no Lewis base was added. Similarly to Comparative Example 1, neodymium tri-2-ethylhexanate was insoluble and was in the swollen gel state. The results are shown in Table 3 together with the results obtained in Examples 2 to 16.

TABLE 3

|  | Lewis base | Lewis base/ neodymium (molar ratio) | Polymerization conversion (%) | Microstructure (%) | | | |
| --- | --- | --- | --- | --- | --- | --- | --- |
|  |  |  |  | Cis-1,4 | 3,4 | Trans-1,4 | 1,2 |
| Example 2 | Methyl alcohol | 2.0 | 89.7 | 96.2 | 3.8 | 0 | 0 |
| Example 3 | 2-Ethylhexyl alcohol | 2.0 | 87.6 | 96.3 | 3.7 | 0 | 0 |
| Example 4 | Benzyl alcohol | 2.0 | 85.7 | 96.1 | 3.9 | 0 | 0 |
| Example 5 | 1,5-Pentanediol | 2.0 | 78.1 | 96.2 | 3.8 | 0 | 0 |
| Example 6 | 1,6-Hexanediol | 2.0 | 80.0 | 96.4 | 3.6 | 0 | 0 |
| Example 7 | Tetrahydrofuran | 2.0 | 85.4 | 96.9 | 3.1 | 0 | 0 |
| Example 8 | Pyridine | 2.0 | 76.5 | 96.2 | 3.8 | 0 | 0 |
| Example 9 | N,N'—Dimethylformamide | 2.0 | 74.6 | 96.1 | 3.9 | 0 | 0 |
| Example 10 | Thiophene | 10.0 | 71.2 | 96.0 | 4.0 | 0 | 0 |
| Example 11 | Diphenyl ether | 10.0 | 81.3 | 97.1 | 2.9 | 0 | 0 |
| Example 12 | Tri-n-ethylphosphine | 2.0 | 70.1 | 96.1 | 3.9 | 0 | 0 |
| Example 13 | Pyridine | 10.0 | 75.7 | 96.2 | 3.8 | 0 | 0 |
| Example 14 | Pyridine | 20.0 | 75.0 | 96.3 | 3.7 | 0 | 0 |
| Example 15 | Pyridine | 30.0 | 72.1 | 96.3 | 3.7 | 0 | 0 |
| Example 16 | Pyridine | 1.0 | 74.7 | 96.3 | 3.7 | 0 | 0 |
| Comparative Example 2 | — | 0 | 61.3 | 95.8 | 4.2 | 0 | 0 |

EXAMPLES 17 TO 22

The same procedure as in Example 2 was repeated, except that the neodymium tri-2-ethylhexanate was replaced by a reaction product of acetylacetone with each of the various carboxylates of rare earth elements shown in Table 4. The results are shown in Table 4.

TABLE 4

|  | Carboxylate of rare earth element | Ratio of acetylacetone to rare earth element (molar ratio) | Polymerization conversion (%) | Microstructure (%) | | | |
| --- | --- | --- | --- | --- | --- | --- | --- |
|  |  |  |  | Cis-1,4 | 3,4 | Trans-1,4 | 1,2 |
| Example 17 | Neodymium tri-n-butanoate $Nd(C_3H_7CO_2)_3$ | 2.0 | 86.2 | 96.7 | 3.3 | 0 | 0 |
| Example 18 | Neodymium tri-n-octanoate $Nd(C_7H_{15}CO_2)_3$ | 2.0 | 89.8 | 96.8 | 3.2 | 0 | 0 |
| Example 19 | Cerium tri-2-ethylhexanoate $Ce(2-C_2H_5.C_5H_{10}CO_2)_3$ | 2.0 | 62.1 | 96.2 | 3.8 | 0 | 0 |
| Example 20 | Praseodymium tri-2-ethylhexanoate $Pr(2-C_2H_5.C_5H_{10}CO_2)_3$ | 2.0 | 65.5 | 96.5 | 3.5 | 0 | 0 |
| Example 21 | Gadolinium tri-2-ethylhexanoate $Gd(2-C_2H_5.C_5H_{10}CO_2)_3$ | 2.0 | 62.3 | 96.6 | 3.4 | 0 | 0 |
| Example 22 | Neodymium tri-pivalate $Nd[(CH_3)_3CCO_2]_3$ | 2.0 | 79.8 | 96.3 | 3.7 | 0 | 0 |

EXAMPLES 23 TO 29 AND COMPARATIVE EXAMPLE 3

The same procedure as in Example 2 was repeated, except that a reaction product of neodymium tri-2-ethylhexanate with acetylacetone (the molar ratio of acetylacetone/neodymium=2.0/1) was used, and that the triethylaluminum was replaced by each of the organic aluminum compounds shown in Table 5. The results are shown in Table 5. Comparative Example 3 is a case in which there was employed a catalyst prepared without using the organic aluminum compound referred to in this invention.

EXAMPLES 30 TO 37 AND COMPARATIVE EXAMPLE 4

The same procedure as in Example 23 was repeated, except that the diethylaluminum chloride was replaced by each of the aluminum halides shown in Table 6.

The results are shown in Table 6.

Comparative Example 4 is a case in which no aluminum halide was used.

TABLE 6

| | Aluminum halide | Aluminum halide/ neodymium (molar ratio) | Polymerization conversion (%) | Microstructure (%) | | | |
|---|---|---|---|---|---|---|---|
| | | | | Cis-1,4 | 3,4 | Trans-1,4 | 1,2 |
| Example 30 | Diethylaluminum chloride | 1.0 | 65.8 | 97.0 | 3.0 | 0 | 0 |
| Example 31 | " | 1.5 | 79.2 | 96.8 | 3.2 | 0 | 0 |
| Example 32 | " | 3.5 | 65.3 | 96.5 | 3.5 | 0 | 0 |
| Example 33 | " | 5.0 | 59.2 | 96.1 | 3.9 | 0 | 0 |
| Example 34 | Sesquialuminium chloride $Al(C_2H_5)_{1.5}Cl_{1.5}$ | 2.0 | 85.7 | 96.5 | 3.5 | 0 | 0 |
| Example 35 | Diethylaluminum bromide $Al(C_2H_5)_2Br$ | 2.5 | 76.8 | 96.0 | 4.0 | 0 | 0 |
| Example 36 | Diethylaluminum iodide $Al(C_2H_5)_2I$ | 2.5 | 77.1 | 96.2 | 4.2 | 0 | 0 |
| Example 37 | Reaction product of aluminum trichloride with triethylaluminum $AlCl_3:Al(C_2H_5)_3 = 1:2$ | 2.5 | 86.3 | 96.8 | 3.2 | 0 | 0 |
| Comparative Example 4 | 0 | 0 | — | — | — | — | |

EXAMPLES 38 TO 42

The same procedure as in Example 28 was repeated, except that the isoprene was replaced by each of the conjugated diene compounds shown in Table 7.

The results are shown in Table 7.

TABLE 5

| | Organic aluminum compound | Organic aluminum compound/ neodymium (molar ratio) | Polymerization conversion (%) | Microstructure (%) | | | |
|---|---|---|---|---|---|---|---|
| | | | | Cis-1,4 | 3,4 | Trans-1,4 | 1,2 |
| Example 23 | Triethylaluminium | 30 | 65.1 | 96.8 | 3.2 | 0 | 0 |
| Example 24 | " | 50 | 88.4 | 96.7 | 3.3 | 0 | 0 |
| Example 25 | " | 100 | 91.2 | 96.6 | 3.4 | 0 | 0 |
| Example 26 | " | 150 | 95.8 | 96.4 | 3.6 | 0 | 0 |
| Example 27 | Triisobutyl-aluminum | 50 | 90.5 | 96.9 | 3.1 | 0 | 0 |
| Example 28 | Tri-n-hexyl-aluminum | 50 | 91.2 | 96.8 | 3.2 | 0 | 0 |
| Example 29 | Diisobutylaluminum hydride | 50 | 89.8 | 96.8 | 3.2 | 0 | 0 |
| Comparative Example 3 | Diethylaluminum chloride | 50 | 1 or less | — | — | — | — |

TABLE 7

|  | Conjugated diene compound (molar ratio in charging) | Polymerization conversion (%) | Tg (°C.) (measured by DSC analysis) | Microstructure (%) | | | |
|---|---|---|---|---|---|---|---|
|  |  |  |  | Cis-1,4 | Trans-1,4 | 1,2 | 3,4 |
| Example 38 | 1,3-Butadiene | 99.2 | −118 | 93.5 | 4.9 | 1.6 | — |
| Example 39 | 1,3-Pentadiene | 60.0 | −44 | — | — | — | — |
| Example 40 | Isoprene-1,3/butadiene (1:1) | 88.2 | −102 | 95.2 | 2.3 | 1.0 | 1.5 |
| Example 41 | 1,3-Butadiene/1,3-pentadiene (1:1) | 66.5 | −107 | — | — | — | — |
| Example 42 | Isoprene/1,3-pentadiene (1:1) | 64.0 | −69 | — | — | — | — |

EXAMPLES 43 TO 53

Into a 300-ml pressure bottle purged with nitrogen were charged in a nitrogen atmosphere 180 g of a mixed solvent of n-hexane and toluene in various ratios and 30 g of butadiene (BD).

On the other hand, into the pressure bottle were charged neodymium octanoate, acetylacetone, triethylaluminum and diethylaluminum chloride in such a proportion that BD/Nd=1×10⁴/1, triethylaluminum/Nd=100/1, diethylaluminum chloride/Nd=2.5/1 and acetylacetone/Nd=2/1 (all the ratios are molar ratios). The contents of the pressure bottle were then subjected to polymerization at 60° C. for 4 hours.

The reaction was terminated by the addition of 2 ml of a methanolic solution of 0.2 g of 2,6-di-tertbutyl-p-cresol.

The polymer solution was poured into methanol to deposit a polymer, which was then dried by means of rolls at 110° C.

The reaction conditions and the Mooney viscosities of the thus obtained polymers are shown in Table 8.

The results are shown in Table 8.

TABLE 8

|  | Toluene content of n-hexane (% by weight) | BD/Nd (molar ratio) | Polymerization conversion (4 hr × 60° C.) (%) | Mooney viscosity (ML$_{1+4}^{100°C.}$) |
|---|---|---|---|---|
| Example 43 | 0 | 1 × 10⁴ | 100 | 135 |
| Example 44 | 0.3 | " | 100 | 110 |
| Example 45 | 1 | " | 100 | 86 |
| Example 46 | 5 | " | 100 | 78 |
| Example 47 | 10 | " | 97 | 65 |
| Example 48 | 25 | " | 95 | 36 |
| Example 49 | 50 | " | 87 | 32 |
| Example 50 | 75 | " | 68 | 22 |
| Example 51 | 100 | " | 25 | 21 |
| Example 52 | 0 | 5 × 10³ | 100 | 115 |
| Example 53 | 0 | 1 × 10³ | 100 | 108 |

It can be seen from Table 8 that when a specific solvent is used in this invention, the molecular weight of a polybutadiene can be controlled to any desired value by using a small amount of a catalyst.

EXAMPLES 54 TO 57

Polymers were obtained by effecting polymerization in the same manner as in Example 46, except that the toluene was replaced by 10% by weight ethylbenzene, xylene, 2,4-dihydronaphthalene or mesitylene.

The results are shown in Table 9.

TABLE 9

|  | Hydrocarbon polymerization solvent (a) | Substituted aromatic hydrocarbon having active hydrogen (b) | Content of (b) (% by weight) | BD/Nd (molar ratio) | Polymerization conversion (4 hrs) (%) | Mooney viscosity (ML$_{1+4}^{100°C.}$) |
|---|---|---|---|---|---|---|
| Example 54 | n-Hexane | Ethylbenzene | 10 | 1 × 10⁴/1 | 100 | 62 |
| Example 55 | " | Xylene | 10 | " | " | 42 |
| Example 56 | " | 2,4-Dihydronaphthalene | 10 | " | " | 40 |
| Example 57 | " | Mesitylene | 10 | " | " | 33 |

It is evident from Table 9 that a molecular-weight-regulating effect is brout about without reduction in polymerization activity of catalyst even when ethylbenzene, xylene, 2,4-dihydronaphthalene or mesitylene is used.

EXAMPLES 58 TO 66

Into a 5-liter autoclave purged with nitrogen were charged 2.5 kg of cyclohexane and 500 g of butadiene in a nitrogen atmosphere.

Thereinto was charged a catalyst previously prepared by reacting neodymium octanoate, acetylacetone, triethylaluminum, diisobutylaluminum hydride and diethylaluminum chloride, which were the catalyst constituents, in the respective amounts shown in Table 10 with butadiene in an amount 5 times that of the neodymium at 50° C. for 30 minutes, and then aging the reaction product. The contents of the autoclave were then subjected to polymerization at 50° C.

In the above case, as shown in Table 10, the catalyst was prepared with varying the molar ratio of the triethylaluminum (AlEt$_3$) to the diisobutylaluminum hydride (i-Bu$_2$AlH).

After the reaction for 2 hours, a methanolic solution of 0.3 g of 2,4-di-tert-butyl-p-cresol was added to the reaction system to terminate the polymerization, after which the solvent was removed by steam stripping, and the residue was dried by means of rolls at 110° C., to obtain a polymer.

The results are summarized in Table 10. In the microstructures of all the polymers thus obtained, the cis-1,4 configuration content was 93%.

It is evident from the results shown in Table 10 that from the viewpoint of both molecular-weight-regulating effect and polymerization activity of catalyst, particularly excellent results can be obtained when in this invention, the ratio (B')/(B'') is in a specific range.

The polymers were subjected to compounding and vulcanization under the conditions shown in Table 11. It can be seen that the Mooney viscosities of the compounds are lowered by the regulation of the molecular weight of the polymers, resulting in higher (improved) tensile strength and smaller (improved) heat-build-up.

wherein the Lewis base is acetylacetone, tetrahydrofuran, pyridine, N,N'-dimethylformamide, thiophene, diphenyl ether, triethylamine, an organic phosphorus compound or a monohydric or dihydric C$_{1-10}$ alcohol, and a carboxylate of a rare earth element in the lanthanum series represented by the formula Ln(R$^1$CO$_2$)$_3$ wherein Ln is a rare earth element in the lanthanum series having an atomic number of 57 to 71 and R$^1$ is a hydrocarbon substituent have 1 to 20 carbon atoms, (B) an organic aluminum compound represented by the formula AlR$^2$R$^3$R$^4$ where R$^2$, R$^3$ and R$^4$, which may be identical or different, represent hydrogen atoms or hydrocarbon substituents having 1 to 8 carbon atoms, excluding the case where all R$^2$, R$^3$ and R$^4$ are hydrogen atoms at the same time, and (C) an (alkyl)aluminum halide represented by the formula AlX$_n$R$^3_{3-n}$ wherein X is Cl, Br, F or I; R$^5$ is an alkyl group having 1 to 8 carbon atoms; and n is a value of 1, 1.5, 2 or 3, or consisting of the (A), (B) and (C) constituents and (D) a conjugated diene.

2. A process according to claim 1, wherein the rare earth element in the lanthanum series is cerium, praseodymium, neodymium or gadolinium.

3. A process according to claim 1, wherein the rare earth element in the lanthanum series is neodymium.

4. A process according to claim 1, wherein R$^1$CO$_2$ is the residue of acetic acid, propionic acid, isobutyric

TABLE 10

| | | Example | | | | | | | | |
|---|---|---|---|---|---|---|---|---|---|---|
| | | 58 | 59 | 60 | 61 | 62 | 63 | 64 | 65 | 66 |
| (1) Catalyst system | | | | | | | | | | |
| (A) Neodymium octenoate | (mmol. × 10$^4$) | 1 | " | " | " | " | " | " | " | " |
| Acetylacetone | (mmol. × 10$^4$) | 2 | " | " | " | " | " | " | " | " |
| (B) Diethylaluminum chloride | (mmol. × 10$^4$) | 2.5 | " | " | " | " | " | " | " | " |
| (B') Triethylaluminum (B'') Diisobutylaluminum hydride | (mmol. × 10$^4$) | 30 | " | " | " | " | " | " | " | " |
| (B')/(B'') | | 100/0 | 95/5 | 90/10 | 85/15 | 75/25 | 50/50 | 25/75 | 10/90 | 0/100 |
| (2) Polymerization conversion (%) | | | | | | | | | | |
| After reaction for 30 min | | 76 | 90 | 88 | 78 | 84 | 74 | 70 | 60 | 48 |
| After reaction for 90 min | | 100 | 100 | 100 | 100 | 100 | 98 | 96 | 75 | 69 |
| (3) Mooney viscosity of raw rubber ML$_{1+4}$ (100° C.) | | 135 | 98 | 90 | 82 | 40 | 25 | 15 | 8 | 8 |
| (4) Mooney viscosity of compound ML$_{1+4}$ (100° C.) | | 113.5 | — | — | — | 105 | 70.5 | — | — | — |
| (5) Physical properties of vulcanizate | | | | | | | | | | |
| 100% Modulus (kg/cm$^2$) | | 27 | — | — | — | 27 | 32 | — | — | — |
| 300% Modulus (kg/cm$^2$) | | 127 | — | — | — | 130 | 136 | — | — | — |
| Tensile strength (kg/cm$^2$) | | 174 | — | — | — | 187 | 206 | — | — | — |
| Goodrich heat-build-up (°C.) | | 19 | — | — | — | 15.5 | 17.5 | — | — | — |

TABLE 11

| Compounding recipe | |
|---|---|
| Rubber | 100 parts by weight |
| Carbon black | 50 parts by weight |
| Zinc oxide | 3 parts by weight |
| Stearic acid | 2 parts by weight |
| Antioxidant (Santoflex 13) | 1.0 parts by weight |
| Vulcanization accelerator (NOBS) | 1.0 parts by weight |
| Sulfur | 1.5 parts by weight |
| (Vulcanization conditions) | |
| 145° C. × 15 min, Press vulcanization | |

What is claimed is:

1. A process for producing a conjugated diene polymer, characterized by polymerizing at least one conjugated diene in a hydrocarbon solvent by using a catalyst consisting of (A) a reaction product of a Lewis base acid, n-valeric acid, isovaleric acid, pivalic acid, n-hexanoic acid, 3,3-dimethylbutyric acid, n-heptanoic acid, n-octanoic acid, 2-ethylhexanoic acid, cyclohexanoic acid, benzoic acid, naphthenic acid, stearic acid, lauric acid, palmitic acid or oleic acid.

5. A process according to claim 3, wherein R$^1$CO$_2$ is the residue of octanoic acid, 2-ethylhexanoic acid, benzoic acid, naphthenic acid, oleic acid or stearic acid.

6. A process according to claim 1, wherein the polymerization is effected at a temperature of −30° C. to 120° C.

7. A process according to claim 1 or 4, wherein the alcohol is methyl alcohol, ethyl alcohol, n-propyl alcohol, isopropyl alcohol, n-butyl alcohol, isobutyl alcohol, tert-butyl alcohol, n-pentyl alcohol, isopentyl alcohol, 2-methyl-1-butyl alcohol, 2-methyl-2-butyl alcohol, n-hexyl alcohol, n-heptyl alcohol, n-octyl alcohol, isooctyl alcohol, 2-ethylhexyl alcohol, n-nonyl alcohol, n-decyl alcohol, 1,5-pentanediol, 1,6-hexanediol, allyl alcohol, crotyl alcohol, 3-hexen-1-ol, citronellol, cyclopentanol, cyclohexanol, salicyl alcohol, benzyl alcohol, phenethyl alcohol or cinnamyl alcohol.

8. A process according to claim 1 or 5, wherein the Lewis base is acetylacetone, methyl alcohol, ethyl alcohol or pyridine.

9. A process according to claim 1, wherein the organic aluminum compound represented by $AlR^2R^3R^4$ is trimethylaluminum, triethylaluminum, tri-n-propylaluminum, triisopropylaluminum, tri-n-butylaluminum, triisobutylaluminum, trihexylaluminum, tricyclohexylaluminum, trioctylaluminum, diethylaluminum hydride, diisobutylaluminum hydride or a mixture of two or more of them.

10. A process according to claim 1, wherein the organic aluminum compound represented by $AlR^2R^3R^4$ is triethylaluminum, triisobutylaluminum, diisobutylaluminum hydride or a mixture of two or more of them.

11. A process according to claim 1, wherein the organic aluminum compound represented by $AlR^2R^3R^4$ is a mixture of (B') a tri-organic aluminum compound represented by $AlR^{2'}_3$ wherein $R^{2'}$ is a $C_{1-8}$ hydrocarbon group and (B'') an organic aluminum hydride represented by $AlH_mR^{2'}_{3-m}$ wherein $R^{2'}$ is as defined above and m is a value of 1 or 2, in which mixture the (B')/(B'') molar ratio is 95/5-25/75; the (B')+(B'')/(A) molar ratio is at least 10; and the (C)/(A) molar ratio is 0.1/1 to 10/1.

12. A process according to claim 1, wherein the (alkyl)aluminum halide represented by $AlX_nR^5_{3-n}$ is dimethylaluminum chloride, diethylaluminum chloride, diethylaluminum bromide, diethylaluminum iodide, diethylaluminum fluoride, di-n-propylaluminum chloride, di-n-butylaluminum chloride, diisobutylaluminum chloride, methylaluminum dichloride, ethylaluminum dichloride, isobutylaluminum dichloride, sesquimethylaluminum chloride, sesquiethylaluminum chloride, sesquiisobutylaluminum chloride, aluminum trichloride, aluminum tribromide, aluminum triiodide, aluminum trifluoride or a mixture thereof.

13. A process according to claim 1, wherein the carboxylate of a rare earth element and the Lewis base are reacted with each other in a molar ratio of 1:0.01 to 1:100.

14. A process according to claim 1, wherein the carboxylate of a rare earth element and the Lewis base are reacted with each other in a molar ratio of 1:0.05 to 1:50.

15. A process according to claim 1, wherein the carboxylate of a rare earth element and the Lewis base are reacted with each other in a molar ratio of 1:0.1 to 1:30.

16. A process according to claim 1, wherein the (B) constituent is used in a proportion of 2 to 300 moles per mole of the carboxylate of a rare earth element for the (A) constituent.

17. A process according to claim 1, wherein the (B) constituent is used in a proportion of 20 to 150 moles per mole of the carboxylate of a rare earth element for the (A) constituent.

18. A process according to claim 10 or 16, wherein the (C) constituent is used in a proportion of 0.5 to 10 moles per mole of the carboxylate of a rare earth element for the (A) constituent.

19. A process according to claim 17, wherein the (C) constituent is used in a proportion of 1 to 5 moles per mole of the carboxylate of a rare earth element for the (A) constituent.

20. A process according to claim 1, wherein the conjugated diene as the (D) constituent is used in a proportion of 100 moles or less per mole of the carboxylate of a rare earth element for the (A) constituent.

21. A process according to claim 1, wherein the conjugated diene as the (D) constituent is used in a proportion of 0.5 to 500 moles per mole of the carboxylate of a rare earth element for the (A) constituent.

22. A process according to claim 1 or 19, wherein the conjugated diene as the (D) constituent is used in a proportion of 2 to 100 moles per mole of the carboxylate of a rare earth element for the (A) constituent.

23. A process according to claim 1 or 20, wherein the conjugated diene is isoprene, butadiene, 1,3-pentadiene or a mixture thereof.

24. A process according to claim 1, wherein the hydrocarbon solvent is butane, n-pentane, isopentane, n-hexane, cyclohexane, cycloheptane, benzene, toluene or a mixture thereof.

25. A process according to claim 1 or 24, wherein the hydrocarbon solvent contains a substituted aromatic hydrocarbon having an active hydrogen, in a proportion of 80% by weight or less.

26. A process according to claim 25, wherein the proportion of the substituted aromatic hydrocarbon is 1 to 50% by weight.

27. A process according to claim 25, wherein the substituted aromatic hydrocarbon has an active hydrogen at the benzyl position.

* * * * *